A. D. LUFKIN.
Reservoir and Washstand Combined.

No. 198,770. Patented Jan. 1, 1878.

Witnesses.
C. A. Root
J. Kretch

Inventor
A. D. Lufkin
Per Burridge & Co.
Attys.

UNITED STATES PATENT OFFICE.

AMOS D. LUFKIN, OF CLEVELAND, OHIO.

IMPROVEMENT IN RESERVOIR AND WASH-STAND COMBINED.

Specification forming part of Letters Patent No. 198,770, dated January 1, 1878; application filed September 10, 1877.

*To all whom it may concern:*

Be it known that I, AMOS D. LUFKIN, of Cleveland, in the county of Cuyahoga and State of Ohio, have invented a certain new and Improved Wash-Stand Bowl and Reservoir Combined; and I do hereby declare that the following is a full, clear, and complete description thereof, reference being had to the accompanying drawings, making a part of the same.

This improvement relates to an article of household furniture combining in one piece all the essentials of a complete wash-stand, free from much of the inconvenience, risk, and expense connected with the stand when the ordinary bowl and pitcher are used, and also free from all danger and offensive gases from sewer-connections, therefore safely used in sleeping-apartments.

This improvement embraces one piece or article of furniture—a stand having a reservoir contiguous to and connected with a wash-bowl, and a pipe or conduit extending from one to the other, provided with a cock to admit and shut off the water from the bowl. The reservoir is in line or with the plane at the top of the bowl, or nearly so, that the water may readily flow from the reservoir into the bowl.

This stand may be of any convenient size, made cheaply or elaborately, varied in style and shape to suit the wants of the market. The parts combined to make this improvement are a bowl and reservoir, with a pipe or tube provided with a valve or self-closing faucet.

Figure 1:
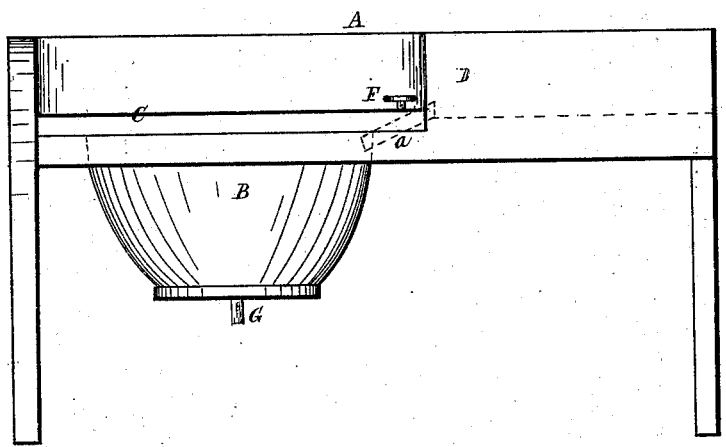

In the drawings, A, Figure 1, represents the wash-stand; D, the reservoir; B, the bowl, and *a* the tube connecting them; F, the lever to open said cock.

Figure 2:
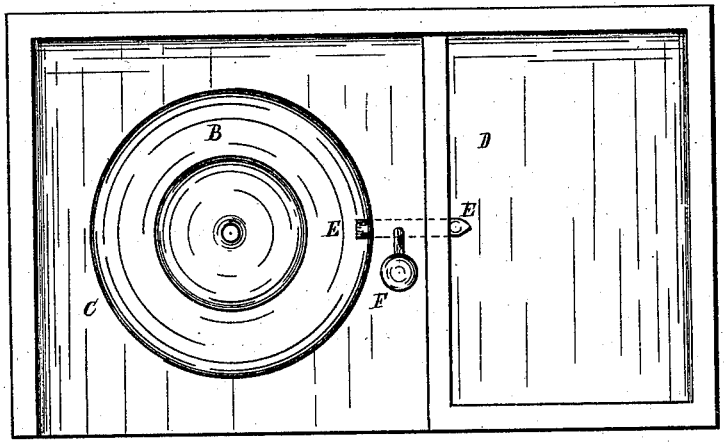

Fig. 2 gives a top view of the stand.

The following is a more minute description of this improvement: The bowl is peculiar in its make. A recess is made in its edge, through which passes one end of the tube into the bowl, as seen in drawing. It has also a slight flange about the rim, just enough to catch and hold the bowl firmly in the place cut for the same in that part of the stand which, extended on a level or a slight incline, forms also the bottom of the reservoir. The bowl is so fitted and so set that its rim or upper surface is on a line with the plane of the bottom of reservoir, thus making a bed for a marble slab over the bowl, intended to finish this part of the stand. There is in and through the bottom of the bowl a tube extending far enough to conduct the waste-water into a bucket properly placed, or to attach a pipe, G, to conduct it where desired.

The tube *a*, of suitable size, extends from cavity in bowl into reservoir, and is supplied with a self-closing valve or faucet, and is so bedded in this part of the stand as to draw the water fully from the one into the other, as desired for use.

The end of the tube in the bowl may be slightly curved downward, to give a more easy flow of water into it, while the opposite end extends to and rests in a hollow place in the bottom of reservoir.

The bottom of the reservoir may be on or near a level with the top of the bowl, as seen in drawing, and having capacity to hold any suitable amount of water. The reservoir can be constructed in any desired form, and of any proper material, and provided with a convenient cover.

The part of the "commode" or stand under the bowl can be closed with a door. This gives a secure place for the waste-water bucket, which is supposed to hold as much as the reservoir, so when the one is full the other is empty, or vice versa.

The part under the reservoir may be made with shelves, and closed with a door, or fitted with drawers.

Thus completed, and ornamented with taste and skill, it becomes an article of furniture both novel and useful, affording many of the conveniences of the stationary wash-stand without the danger to health from sewer-connections, without the expense of extended water-pipes, with their liability to freezing in winter, and without the inconvenience and expense of bowls and pitchers, so apt to be broken.

I am aware that portable wash-stands have been heretofore supplied with bowls and reservoirs for water; but such have lacked simplicity of construction, and from the arrangement of pipes and siphons, with their controlling-valves, have added greatly to the cost of construction, liability to get out of order, and subsequent difficulties in repairs.

In my apparatus I have greatly simplified the elements, reduced them to a minimum of cost, and rendered the apparatus susceptible of easy repairs.

What I claim as my invention, and desire to secure by Letters Patent, is—

The wash-stand having within it a bowl, B, with its waste-pipe G, and a reservoir, D, placed within the stand, having its bottom at, or slightly above, the rim of the bowl B, and on one side thereof formed by a partition in the stand, the reservoir connected to the bowl by a pipe, a, and stop-cock F, all constructed substantially as and for the purpose described.

AMOS D. LUFKIN.

Witnesses:
W. H. BURRIDGE,
J. H. BURRIDGE.